Aug. 9, 1966

Filed Oct. 2, 1962

D. DANIELSEN

PLURAL ELECTRICAL PATHS MONITORED BY COMPARISON OF TRANSIENTS 3,266,017

2 Sheets-Sheet 1

INVENTOR
BY D. DANIELSEN
Sylvan Sherman
ATTORNEY

INVENTOR
D. DANIELSEN
BY
Sylvan Sherman
ATTORNEY

United States Patent Office 3,266,017
Patented August 9, 1966

3,266,017

PLURAL ELECTRICAL PATHS MONITORED BY COMPARISON OF TRANSIENTS

Daniel Danielsen, Wall, N.J., assignor to Bell Telephone Laboratories, Incorporated, New York, N.Y., a corporation of New York Filed Oct. 2, 1962, Ser. No. 227,813
8 Claims. (Cl. 340—149)

This invention relates to electrical transmission systems and, in particular, to automatic telephone exchanges.

In any telephone switching system it is often necessary to insure that only one path of several possible parallel paths is completed between one portion of the system and another. This selection of a single path out of many possible paths is performed repeatedly within the switching system and each path selection must be automatically and rapidly verified in order to insure that there will ultimately be established only one path between any two subscribers.

It is, accordingly, an object of this invention to verify that only one operate path is established in a group of N possible paths.

It is another object of this invention to generate corrective signals in the event that more or less than one operate path is established.

In accordance with the invention, the transient current induced at the time an operate path should be established is compared with a reference current. The reference current is limited in its peak amplitude and duration to resemble the transient current in a single operate path. When only one operate path is established, the path current and the reference current are substantially equal and no corrective signal is induced. However, in the event that no operate path or more than one operate path is established, there is an unbalance in the verification circuit and a corrective signal is induced.

In a first embodiment of the invention a malfunction is indicated by a pulse of a given polarity at one or the other of two separate outputs. In a second embodiment of the invention, a malfunction is indicated by either a positive or a negative pulse at one output.

These and other objects and advantages, the nature of the present invention, and its various features, will appear more fully upon consideration of the various illustrative embodiments now to be described in detail in connection with the accompanying drawings in which.

Figure 1:
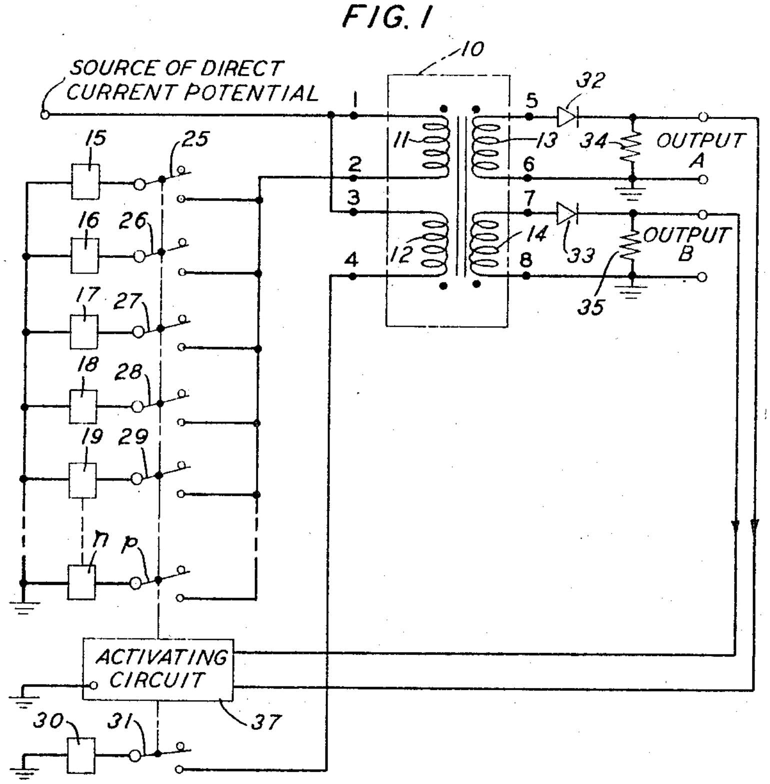
FIG. 1 is a first illustrative embodiment of the invention having two outputs.

Referring to FIG. 1, there is shown a path verifier in accordance with the invention comprising a transformer 10 having a first pair of oppositely wound windings 11 and 12, (having terminal designations 1–2 and 3–4, respectively) and a second pair of oppositely wound windings 13 and 14 (having terminal designations 5–6 and 7–8, respectively). Thus, the magnetic flux induced by a current flowing between terminals 1 and 2 of winding 11 has a direction that is opposite to the flux induced by a current flowing between terminals 3 and 4 of winding 12. A similar situation exists with respect to windings 13 and 14.

Terminals 1 and 3 of transformer 10 are connected to a common source of direct current potential (not shown). Terminal 2 is connected to ground through a plurality of substantially similar parallel connected electrical paths (15, 16, . . . *n*) and in identical plurality of switches (25, 26, . . . *p*). Terminal 4 of transformer 10 is connected to ground through a load 30 and a switch 31.

The path switches 25 through *p* and the switch 31 are controlled by an activating circuit 37 which typically comprises some sort of selection circuit arrangement. Examples of this type of circuit are given in chapter 13 of the text "The Design of Switching Circuits" by W. Keister, A. E. Ritchie and S. H. Washburn, published by D. Van Nostrand Company, Inc. Alternatively, other circuit arrangements can be used depending upon the particular application.

The circuit defined by winding 12, load 30 and switch 31 is the reference circuit. The impedance of load 30 is selected such that when switch 31 closes, the transient current which flows through this reference circuit has the same peak amplitude and duration as the transient current which flows when any one of the paths 15 to *n* is energized.

The windings 13 and 14 are each connected in series with a diode-resistor combination 32–34 and 33–35, respectively. The output from the verification circuit of FIG. 1 is taken across resistor 34 and 35.

In normal operation only one of the paths 15 through *n* is activated at any given time by the closing of one of the switches 25 through *p*. This causes a transient current to flow through winding 11 of transformer 10. At the instant of "cut-through," switch 31 is also closed by the activating circuit 37 causing a transient current to flow in winding 12. Because the impedance of load 30 is selected to cause substantially the same transient current to flow through winding 12 as is caused to flow through winding 11 by the activated path and because of the manner in which the windings are wound, the net magnetic flux induced in the transformer in normal operation is substantially zero and there is no output at either of the outputs A or B. If, on the other hand, due to a malfunction, none of the paths is completed, the flux induced by the reference current flowing in winding 12 is not canceled and voltages of opposite polarity are induced in the windings 13 and 14, respectively. Depending upon the manner in which the diodes 32 and 33 are poled, current will flow in either one or the other of the output circuits. For example, let it be assumed that the windings are wound such that the voltages induced in windings 13 and 14 are such that terminal 5 is positive with respect to terminal 6 and terminal 7 is negative with respect to terminal 8. With the diodes 32 and 33 poled as shown, a current is caused to flow through resistor 34 producing a positive pulse at output A. Substantially no current flows in resistor 35 and the output at output B is essentially zero.

An alternative malfunction could result if more than one of the paths is completed. In this latter situation, the current in winding 11 is greater than the reference current, thereby inducing voltages across windings 13 and 14 whose polarities are the reverse of the polarities induced when no path was completed. In this second situation, no current flows in resistor 34 and, hence, the output at output A is zero whereas current flows in resistor 35 producing a positive pulse at output B.

The pulses produced at either output A or output B are fed back to the activating circuit 37 in order to correct the malfunction and thereby arrive at a situation where only a single path is completed.

Figure 2:
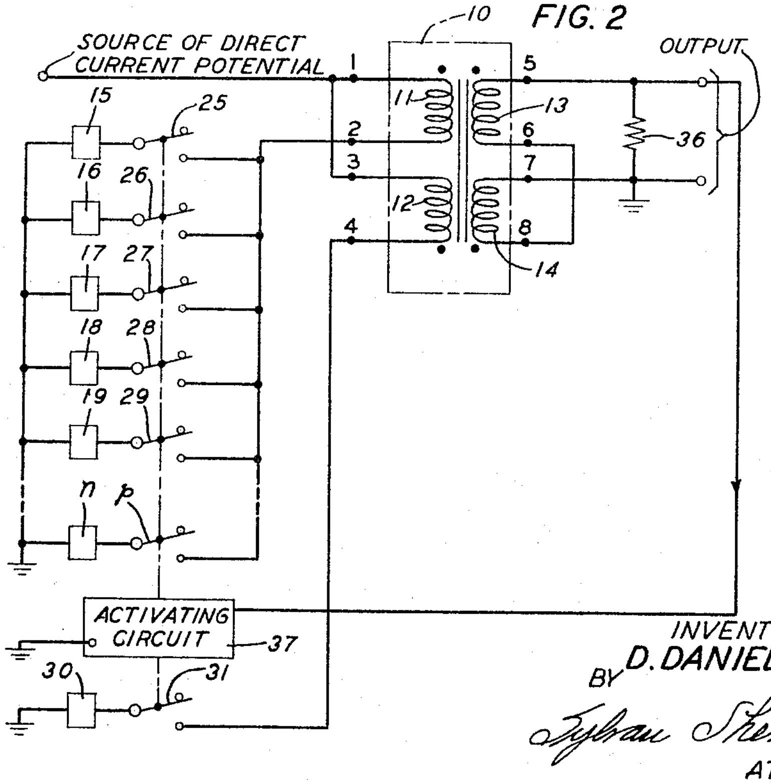
FIG. 2 is a second illustrative embodiment of the invention having a single output.

In a second embodiment of the invention shown in FIG. 2 (using the same transformer 10 that was used in FIG. 1), the windings 13 and 14 are connected series-aiding with terminal 6 of winding 13 connected to terminal 8 of winding 14. A single resistor 36 is connected between terminals 5 and 7.

The operation of the embodiment of FIG. 2 is substantially the same as that of FIG. 1 in that no output is obtained when only one path is completed. If there is a malfunction, however, the voltages induced in windings 13 and 14 add. For the polarity of induced voltages assumed above, and assuming that none of the paths is completed, a positive pulse is produced across resistor 36. If, however, more than one path is completed, a voltage of opposite polarity is induced across the windings 13 and 14 and a negative pulse is produced across resistor 36. Thus, in the embodiment of FIG. 2, a malfunction is indicated by either a positive or a negative pulse produced at the output terminals.

In both embodiments of the invention, windings 11 and 12 were substantially identical so that equal current in each induces an equal amount of magnetic flux. It is apparent, however, that windings 11 and 12 need not be identical. Operation in the manner described above can be obtained using dissimilar windings by modifying the amplitude of the reference current accordingly so that the net magnetic flux induced by the dissimilar windings is nevertheless equal when one path is completed.

The secondary windings 13 and 14, on the other hand, need not be identical. Their design is dictated primarily by the amplitude of output signal required to operate the corrective portion of the activating circuit. It should also be noted that in the embodiment of FIG. 2, it is not necessary that there be two secondary windings. Thus, the windings 13 and 14 could be replaced by a single winding.

Figure 3:
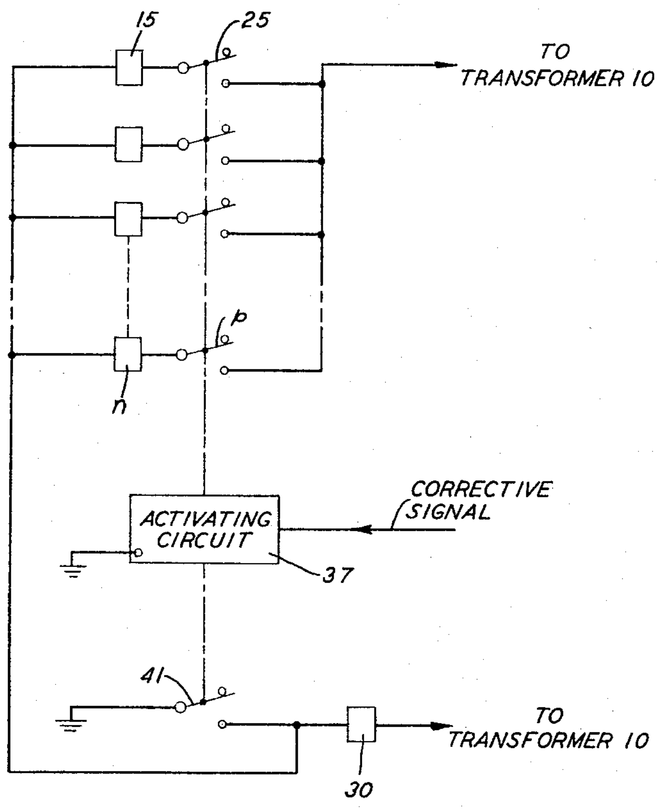
FIG. 3, given for purposes of illustration, shows an alternative timing arrangement.

It is apparent that in the operation of the embodiments of FIGS. 1 and 2, the timing is such that the operate path and the reference circuit are energized at the same time. In these illustrative embodiments the necessary timing is controlled by the activating circuit 37. In an alternative arrangement, shown in FIG. 3, proper timing is insured by completing the operate paths and the reference circuit through a common switch 41. In this latter arrangement, the activating circuit closes one of the path switches 25 through $p$ first and then, at a slightly later time, closes the common switch 41.

While the invention was described in connection with a telephone exchange, it is to be understood that the principle of operation can be employed more generally in any situation wherein it is desirable to ascertain the number of circuits that have been completed at a particular time. Whereas it was only necessary in the specific application described in detail hereinabove to know whether fewer or more than one path was completed, it is apparent that the invention can be applied to situations where more than one path is to be completed in the normal course of events. In this latter situation, the amplitude of the flux induced by the reference current is increased to equal the flux produced when the requisite number of paths are completed. Corrective signals are then induced if more or fewer than the requisite number of paths are completed in the manner described hereinabove. Where it is desirable to know more specifically how many paths are completed, the amplitude of the output pulses produced can be calibrated since their amplitude is a function of the difference between the flux produced by the reference current and the flux produced by the current in the completed paths. The latter current is, of course, proportional to the number of paths completed. Thus, in all cases it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An automatic path verifier comprising:
a plurality of substantially identical electrical paths;
means for selectively completing said paths;
means for producing a transient reference current;
means for comparing said reference current with the transient current induced when any of said paths is completed;
and means for inducing a corrective output signal when the number of completed paths is any number different than one.

2. An automatic path verifier comprising:
a plurality of substantially identical electrical paths;
a transformer having a multiplicity of windings;
means for connecting a source of potential to a terminal of each of two windings on said transformer;
means for connecting the other terminal of one of said two windings to said plurality of paths;
means for connecting the other terminal of the other of said two windings to a reference circuit whose parameters are selected to produce substantially the same transient current when completed as one of said plurality of paths produces when completed;
activating means for completing said reference circuit at the same time one of said paths should be completed;
and means for measuring the difference in magnetic flux produced in said two windings.

3. The verifier in accordance with claim 2 wherein;
the magnetic flux induced by said two windings are equal when one of said paths is completed.

4. The verifier according to claim 3 wherein;
said windings are oppositely wound on said transformer to produce no net magnetic flux when one of said paths is completed.

5. The verifier in accordance with claim 2 wherein said measuring means comprises:
a pair of magnetically coupled unidirectional circuits.

6. The verifier in accordance with claim 2 wherein said measuring means comprises:
a magnetically coupled bilateral circuit.

7. An automatic path verifier comprising:
a plurality of substantially identical electrical paths;
means for selectively completing said paths thereby producing a transient magnetic flux;
means for ascertaining whether any of said paths are completed comprising a reference path, including means for producing a transient magnetic flux proportional to the transient magnetic flux produced when one of said plurality of paths is completed;
activating means for selectively completing said paths and for simultaneously completing said reference path;
and means for comparing the transient flux produced by said reference path with any transient flux induced by said plurality of paths.

8. An automatic path verifier comprising:
a plurality of substantially identical electrical paths;
means for selectively completing said paths;
means for producing a transient reference current;
means for comparing said reference current with the transient current induced when one or more of said paths are completed;
and means for inducing a corrective output signal when the number of completed paths is any number different than a given number of said paths.

(References on following page)

References Cited by the Examiner

UNITED STATES PATENTS

| | | | |
|---|---|---|---|
| 2,675,538 | 4/1954 | Malthaner et al. | 340—149 |
| 2,676,253 | 4/1954 | Ayres | 340—149 |
| 2,783,453 | 2/1957 | Rose | 340—149 |
| 2,837,665 | 6/1958 | Edwards. | |
| 2,879,411 | 3/1959 | Faulkner | 328—146 |
| 2,943,303 | 6/1960 | Barber | 340—149 X |
| 3,025,414 | 3/1962 | McVey | 328—147 X |
| 3,103,646 | 9/1963 | Sheaffer et al. | 340—149 X |
| 3,105,155 | 9/1963 | Barber | 340—149 X |
| 3,158,838 | 11/1964 | Gilbert | 340—149 X |
| 3,208,042 | 9/1965 | Haigh et al. | 340—149 |

NEIL C. READ, *Primary Examiner.*

H. PITTS, *Assistant Examiner.*